US009256454B2

(12) United States Patent
Bell et al.

(10) Patent No.: US 9,256,454 B2
(45) Date of Patent: *Feb. 9, 2016

(54) DETERMINING OPTIMAL METHODS FOR CREATING VIRTUAL MACHINES

(71) Applicant: International Business Machines Corporation, Armonk, NY (US)

(72) Inventors: Eugene Bell, Cork (IL); Eoin Byrne, Cork (IL); Padraig MacSeain, Cork (IL); Adrian O'Sullivan, Cork (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,356

(22) Filed: Sep. 5, 2014

(65) Prior Publication Data

US 2015/0082307 A1 Mar. 19, 2015

Related U.S. Application Data

(63) Continuation of application No. 14/031,305, filed on Sep. 19, 2013, now Pat. No. 9,110,699.

(51) Int. Cl.
*G06F 9/44* (2006.01)
*G06F 9/455* (2006.01)
*G06F 17/30* (2006.01)

(52) U.S. Cl.
CPC .............. *G06F 9/45533* (2013.01); *G06F 8/20* (2013.01); *G06F 17/30424* (2013.01); *G06F 8/30* (2013.01); *G06F 8/36* (2013.01); *G06F 8/71* (2013.01); *G06F 2009/45562* (2013.01)

(58) Field of Classification Search
CPC ............... G06F 8/20; G06F 8/30; G06F 8/36; G06F 8/71; G06F 9/44505; G06F 9/44589; G06F 11/3688; G06F 11/3684
See application file for complete search history.

(56) References Cited

U.S. PATENT DOCUMENTS

| 8,037,289 | B1 * | 10/2011 | Karnik et al. ............... 713/1 |
| 8,370,819 | B2 | 2/2013 | Chakraborty et al. |
| 8,656,018 | B1 * | 2/2014 | Keagy et al. ............... 709/226 |
| 9,110,699 | B2 * | 8/2015 | Bell et al. |
| 2003/0056054 | A1 * | 3/2003 | Levy et al. ............... 711/6 |

(Continued)

FOREIGN PATENT DOCUMENTS

WO 2009026703 A1 3/2009

OTHER PUBLICATIONS

Ashino et al., "Virtual Machine Migration Method between Different Hypervisor Implementations and Its Evaluation", 2012 IEEE, Mar. 26, 2012, pp. 1089-1094; <http://ieeexplore.ieee.org/stamp/stamp.jsp?tp=&arnumber=6185394>.*

(Continued)

*Primary Examiner* — Thuy Dao
*Assistant Examiner* — Ben C Wang
(74) *Attorney, Agent, or Firm* — Edward J. Wixted, III; Isaac J. Gooshaw

(57) ABSTRACT

A computer receives at least one requirement for a new VM. The computer identifies an existing VM to be modified during the generation of the new VM. The computer determines at least one step necessary to create the new VM configuration from the existing VM. The computer presents at least one pathway to the new VM from the existing VM. The computer receives a selection of a presented pathway to create the new VM.

10 Claims, 3 Drawing Sheets

(56) References Cited

U.S. PATENT DOCUMENTS

| | | | |
|---|---|---|---|
| 2006/0218544 A1* | 9/2006 | Chakraborty et al. | 717/168 |
| 2007/0168940 A1* | 7/2007 | Lunawat | 717/108 |
| 2007/0300220 A1* | 12/2007 | Seliger et al. | 718/1 |
| 2008/0089338 A1 | 4/2008 | Campbell et al. | |
| 2009/0288084 A1* | 11/2009 | Astete et al. | 718/1 |
| 2011/0022694 A1 | 1/2011 | Dalal et al. | |
| 2011/0213765 A1 | 9/2011 | Cui et al. | |
| 2012/0131480 A1* | 5/2012 | Kalmbach et al. | 715/763 |
| 2012/0151480 A1* | 6/2012 | Diehl et al. | 718/1 |
| 2012/0272238 A1 | 10/2012 | Baron | |
| 2013/0036214 A1* | 2/2013 | Carmel et al. | 709/223 |
| 2013/0275975 A1 | 10/2013 | Masuda et al. | |
| 2013/0297964 A1* | 11/2013 | Hegdal et al. | 714/2 |
| 2013/0346615 A1 | 12/2013 | Gondi | |
| 2014/0059539 A1* | 2/2014 | Simonsen et al. | 718/1 |
| 2014/0215267 A1 | 7/2014 | Hegdal et al. | |
| 2014/0223428 A1 | 8/2014 | Hackett et al. | |
| 2014/0229939 A1 | 8/2014 | Dias de Assuncao et al. | |
| 2014/0258235 A1 | 9/2014 | Jin et al. | |
| 2014/0258238 A1 | 9/2014 | Jin et al. | |
| 2015/0082307 A1 | 3/2015 | Bell et al. | |

OTHER PUBLICATIONS

Carl A. Waldspurger, "Memory resource management in VMware ESX server", ACM SIGOPS Operating Systems Review—OSDI'02, vol. 36 Issue SI, Dec. 31, 2002, pp. 181-194; <http://dl.acm.org/citation.cfm?id=844146>.*

Li et., "Virtual Machine Placement for Predictable and Time-Constrained Peak Loads", Springer-Verlag Berlin Heidelberg, Dec. 5, 2011, LNCS 7150, pp. 120-134; <http://link.springer.com/chapter/10.1007%2F978-3-642-28675-9_9#page-1>.*

Singh, "Creating and Working with Virtual Environments", Jun. 2, 2009, <http://blogs.msdn.com/b/lab_management/archive/2009/06/02/creation-and-working-with-virtual-environments.aspx>.

Ismael, "Creating development environments with Vagrant and Puppet", Jan. 11, 2013, © 2013 ServerGrove | The PHP Hosting Co., <http://blog.servergrove.com/2013/01/11/creating-development-environments-with-vagrant-and-puppet/>.

U.S. Appl. No. 14/031,305, entitled "Determining Optimal Methods for Creating Virtual Machines", filed Sep. 19, 2013.

Ashino et al., "Virtual Machine Migration Method between Different Hypervisor Implementations and its Evaluation", 2012 IEEE, Mar. 26, 2012, pp. 1089-1094; <http: ieeexplore.ieee.org/stamp/stamp.jsp?tp=&arnumber=6185394>.

Carl A. Waldspurger, "Memory resource management in VMware ESX server" ACM SIGOPS Operating Systems Review—OSDI'02, vol. 36 issue SI, Dec. 31, 2002, pp. 181-194; <http://dl.acm.org/citation.cfm?id=844146>.

Li et al., "Virtual Machine Placement for Predictable and Time-Constrained Peak Loads", Springer-Verlag Berlin Heidelberg, Dec. 5, 2011, LNCS 7150, pp. 120-134; <http://link.springer.com/chapter/10.1007%2F978-3-642-28675-9_9#page-1>.

U.S. Appl. No. 14/753,090, entitled "Determining Optimal Methods for Creating Virtual Machines", filed Jun. 29, 2015.

* cited by examiner

DETERMINING OPTIMAL METHODS FOR CREATING VIRTUAL MACHINES

FIELD OF THE INVENTION

The present invention relates generally to the field of virtual machines, and more particularly to the creation of virtual machines with specific attributes.

BACKGROUND OF THE INVENTION

Virtual machines (VMs) are commonly utilized by software development teams to test new software across many Operating Systems and different software configurations without needing to use a different physical machine to create each testing environment. Use of a virtual machine instead of a physical machine for each test environment allows for increased efficiency and lower costs of running tests. Testing software on a large scale can often require the use of many virtual machines, which has lead to new methods for creating virtual machines.

SUMMARY

Embodiments of the present invention disclose a method, computer program product, and system for determining optimal pathways for creating a virtual machine (VM) with a given set of requirements. A computer receives at least one requirement for a new VM. The computer identifies an existing VM to be modified during the generation of the new VM. The computer determines at least one step necessary to create the new VM configuration from the existing VM. The computer presents at least one pathway to the new VM from the existing VM. The computer receives a selection of a presented pathway to create the new VM.

DETAILED DESCRIPTION

Figure 1:
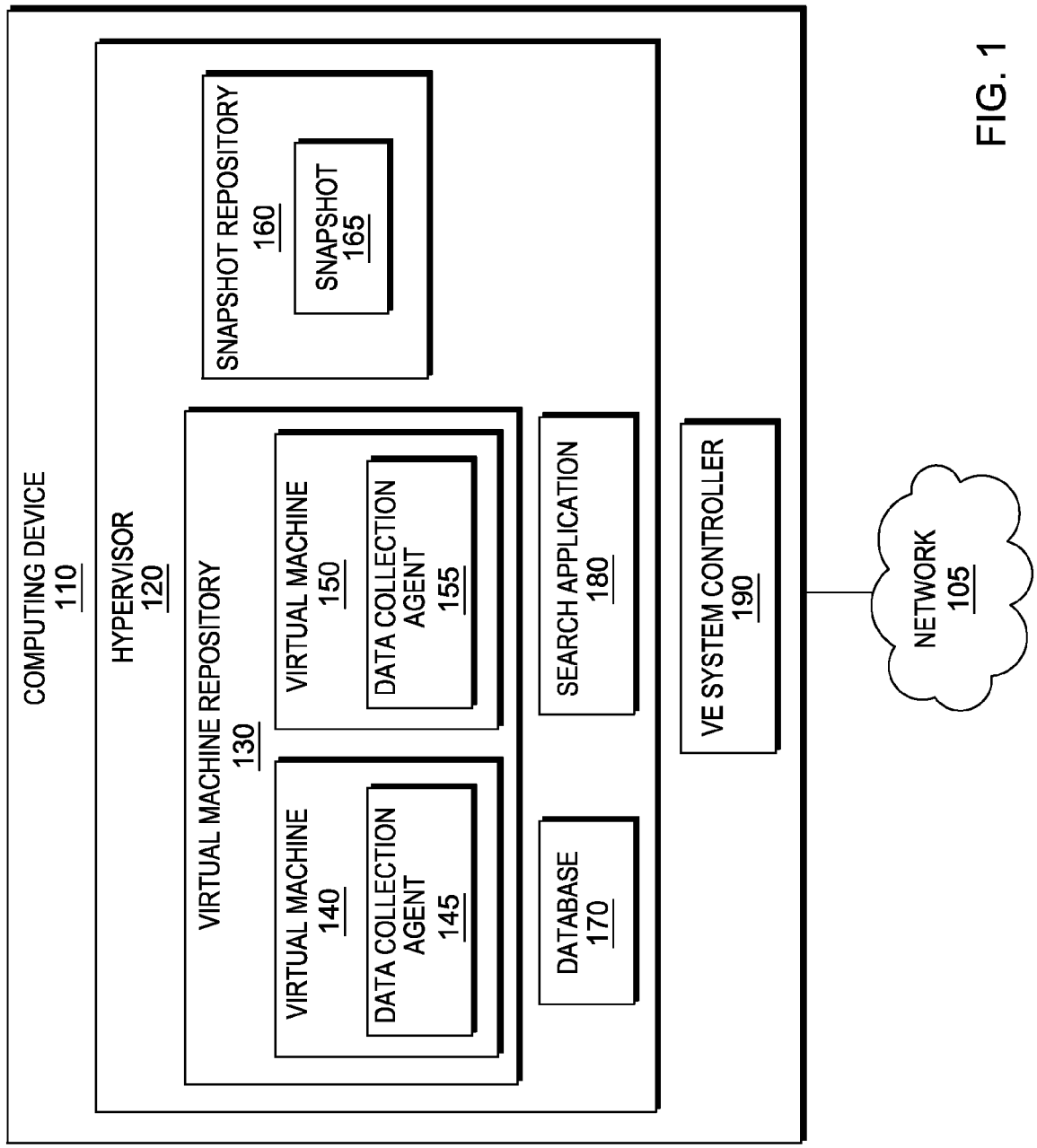
FIG. 1 is a functional block diagram illustrating a data processing environment, in accordance with an embodiment of the present invention.

The traditional method of creating a virtual machine involves installing an operating system and additional software onto a virtual system running on a host computing device. Because many virtual machines can share the same physical hardware, virtual machines can also be created by duplicating, or "cloning" existing virtual machines. This is particularly useful if an identical copy of an existing virtual machine is required.

Snapshots are used to save the state of a virtual machine at a given point in time. Snapshots capture all data, applications, settings, and the Operating System present on a virtual machine at the point in time when the snapshot is taken. Snapshots can be used to restore a virtual machine in the event that an error occurs or data becomes corrupted. Another user for a snapshot is to create a new virtual machine from a previous state of a virtual machine captured by a snapshot.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a Data Processing Environment, in accordance with one embodiment of the present invention. The data processing environment includes network 105, computing device 110, hypervisor 120, virtual machine repository 130, virtual machines 140 and 150, data collection agents 145 and 155, snapshot repository 160, snapshot 165, database 170, search application 180, and system controller 190.

In an exemplary embodiment, hypervisor 120, virtual machine repository 130, virtual machines 140 and 150, data collection agents 145 and 155, snapshot repository 160, snapshot 165, database 170, search application 180, and system controller 190 are stored on computing device 110. However, in other embodiments, hypervisor 120, virtual machines 140 and 150, snapshot 165, database 170, search application 180, and system controller 190 may be stored externally and accessed through a communication network, such as network 105. Network 105 can be, for example, a local area network (LAN), a wide area network (WAN) such as the internet, or a combination of the two, and may include wired, wireless, fiber optic or any other connection known in the art. In general, network 105 can be any combination of connections and protocols that will support communications between computing device 110, hypervisor 120, virtual machine repository 130, virtual machines 140 and 150, data collection agents 145 and 155 snapshot repository 160, snapshot 165, database 170, search application 180, and system controller 190 are stored on computing device 110. However, in other embodiments, hypervisor 120, virtual machines 140 and 150, snapshot 165, database 170, search application 180, and system controller 190 in accordance with a desired embodiment of the present invention.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to network 105, hypervisor 120, virtual machines 140 and 150, snapshot 165, database 170, search application 180 and system controller 190 and is capable of executing search application 180. Computing device 110 may include internal and external hardware components, as depicted and described in further detail with respect to FIG. 5.

In various embodiments of the current invention, hypervisor 120 is an emulation program that allows virtual machines to be executed on computing device 110. Hypervisor 120 can be (a) a virtual machine monitor that runs along the host operating system, (b) a specialized host operating system having native emulation capabilities, or (c) a host operating system with a hypervisor component wherein the hypervisor component performs the emulation. In general, hypervisor 120 can be any program or software capable of emulating an environment to execute virtual machines.

In an exemplary embodiment, VM repository 130 is a computer database containing virtual machines 140 and 150. Virtual machines 140 and 150 are virtual machines stored within VM repository 130. Virtual machines 140 and 150 are software implemented abstractions of hardware included in computing device 110. In general, virtual machines 140 and 150 can be utilized to emulate functions of a physical computer (e.g., execute programs). In another embodiment, virtual machines 140 and 150 are representations of virtual devices that are being implemented on computing device 110. In one embodiment, the resources of computing device 110 (e.g., memory, central processing units (CPUs), storage devices, and I/O devices) can be partitioned for use by one or more virtual machines including virtual machines 140 and 150.

In exemplary embodiments, data collection agents 145 and 155 are computer programs installed onto virtual machines 140 and 150. Data collection agents 145 and 155 generate application install data and communicate collected data to database 170. Data collection agent 145 and 155 operate by detecting an installation occurring on a virtual machine on which either data collection agent is installed e.g., 145 or 155. In an exemplary embodiment of the present invention, data collection agents 145 and 155 will generate data such as the number of steps required to complete an installation of a software component, the total time required for the installation of a software component, and the amount of user input required during the installation of a software component upon completion of an installation process. The generated data is sent to and stored as part of database 170.

In exemplary embodiments, snapshot repository 160 is a computer database containing all snapshots taken of virtual machines present in virtual machine repository 130. Snapshot library 160 contains snapshot 165. In certain embodiments, snapshot 165 includes a record of an earlier state of a virtual machine present in virtual machine repository 130.

In general, snapshot 165 includes a record of an earlier state of a virtual machine present in virtual machine repository 130. Snapshot 165 facilitates the operation of restoring its corresponding virtual machine to its state at the time the snapshot was created. The record comprising snapshot 165 includes a copy of all data present on the virtual machine's storage which may be an emulated version of a hard drive, solid state drive, or any other computer storage device known in the art. Snapshot 165 also includes the state of virtual machine 165's memory, which may be an emulated version of random access memory or any other computer storage medium known in the art.

Database 170 is a computer database containing records of all present virtual machines and snapshots in virtual machine repository 130 as well as snapshot repository 160. Database 170 receives data from data collection agents 145, data collection agent 155, and system controller 190.

Search application 180 is a software program that utilizes data stored in database 170 to determine possible sequences of steps required to create a new virtual machine with a given set of attributes. In an exemplary embodiment of the present invention, the process of determining the sequence of steps required to create a new virtual machine with a given set of attributes comprises (a) receiving the requirements for a new virtual machine from a user, (b) searching through records of existing virtual machines and snapshots stored in database 170 for a record which includes similar software properties, and (c) determining the additional steps required to create a new virtual machine using an existing record as a starting point, if any.

System controller 190 is a system controller for hypervisor 120. System controller 190 observes the behavior and actions of hypervisor 120 and sends a record of any action performed to database 170. In an exemplary embodiment, actions recorded include (a) a virtual machine being copied to create a new virtual machine, (b) a virtual machine being deleted, (c) a snapshot being created from a virtual machine, and (d) a virtual machine being restored from a record contained in a snapshot.

Figure 2:
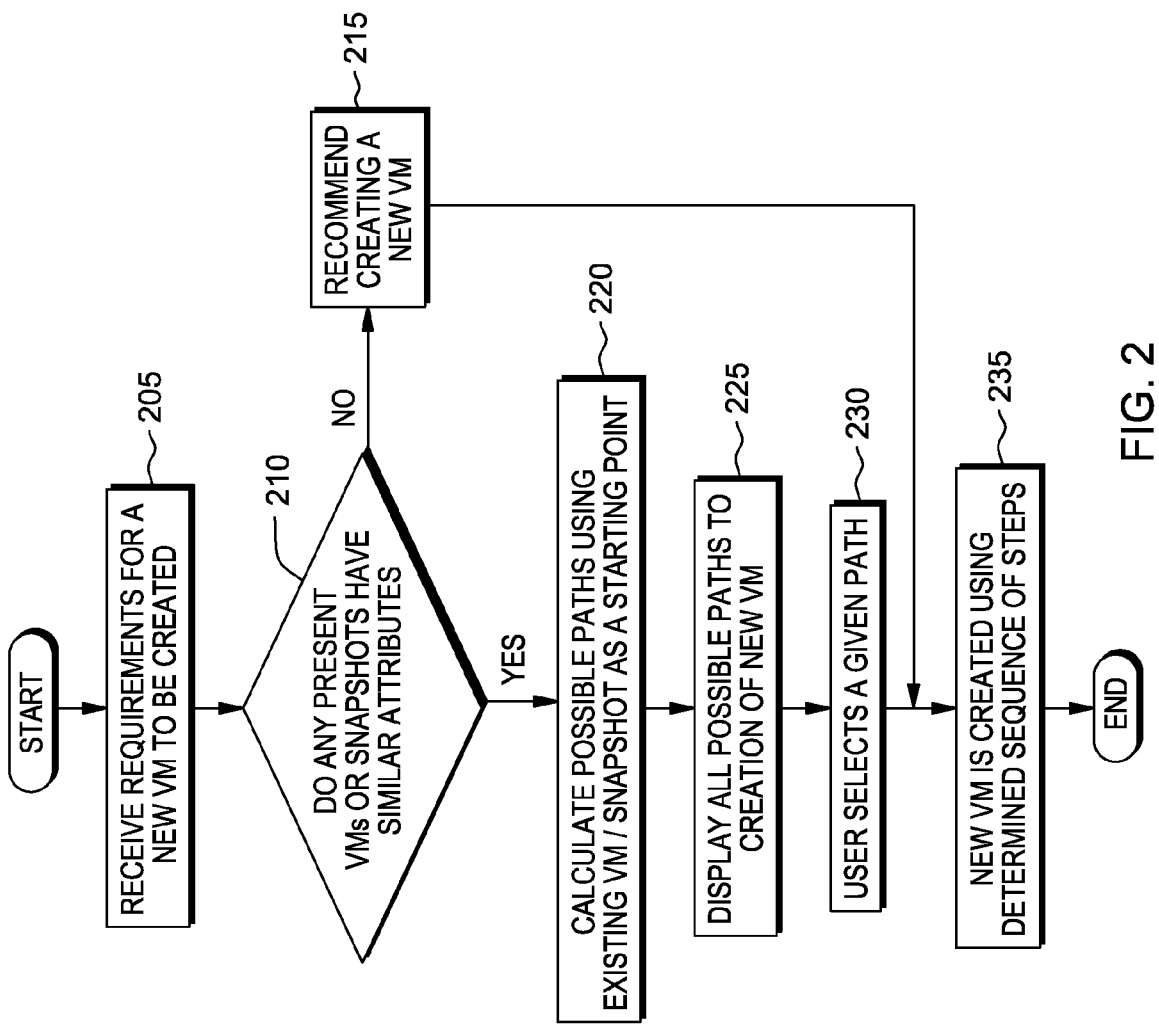
FIG. 2 is a flowchart depicting operational steps of a search application, executing on a computing device within the data processing environment of FIG. 1.

FIG. 2 is a flowchart depicting operational steps of search application 180 for determining the possible sequences of steps required to create the desired virtual machine, in accordance with an embodiment of the present invention.

Search application 180 is a software program which determines all possible sequences of steps required for creating a new virtual machine with a given set of attributes and presents them to the user.

In an exemplary embodiment of the present invention, a user inputs requirements for a new virtual machine into search application 180. Search application 180 receives requirements for a new virtual machine from a user in step 205.

Search application 180 performs a query of database 170 to search for available virtual machines or snapshots possessing attributes required for the new virtual machine to be created in decision step 210. These attributes can include at least one of (a) an operating system, (b) an installed software application, (c) an amount of hardware resources available to the virtual machine.

If no virtual machines or snapshots within virtual machine repository 130 or snapshot repository 160 have any of the attributes required for the new virtual machine (decision step 210, no branch), search application 150 will recommend creating a new virtual machine without using an existing virtual machine or snapshot as a starting point, in step 215. Once a recommendation to create a new virtual machine without the use of an existing virtual machine or snapshot is made, the new virtual machine will be created using the determined sequence of steps in step 235.

If a virtual machines or snapshots can be used as a starting point to create the new required virtual machine (decision step 210, yes branch), all the possible sequences of steps to create the new virtual machine using the existing virtual machines and snapshots are determined in step 220. A sequence of steps can include one or more of (a) making a copy of a virtual machine, (b) restoring a virtual machine from a snapshot, (c) installing or uninstalling additional software onto a virtual machine, or (d) changing the amount of hardware resources available to a virtual machine.

Possible sequences of steps which can be used to create the new virtual machine are presented to the user in step 225. In various embodiments of the current invention, additional information may be displayed along with each set of possible steps determined. Additional information can include one or more of (a) the total time required for the sequence of steps to be performed, (b) the number of steps required to complete the generation of the virtual machine, or (c) the complexity of the steps required within the sequence of steps. The complexity of a sequence of steps can be determined using one or more of (a) the number of keystrokes required to install a software component, (b) the amount of manual data input required to install additional software, or (c) the number of carriage returns required to install additional software.

Once all possible sequences of steps are determined, the user selects a presented sequence of steps to be used to build the new virtual machine, in step 230.

The new virtual machine is created using the selected pathway, which was generated in step 220 and was selected by the user in step 230. In an exemplary embodiment of the present invention, the user manually creates the virtual machine by following the selected sequence of steps provided. In other embodiments, search application 180 triggers the creation of the new virtual machine by an automated system. An automated system for creating a desired virtual machine can include running scripting created by search application 180 which provides program instructions allowing a configuration management application such as puppet or chef to follow the selected sequence of steps to create the new virtual machine.

Figure 3:
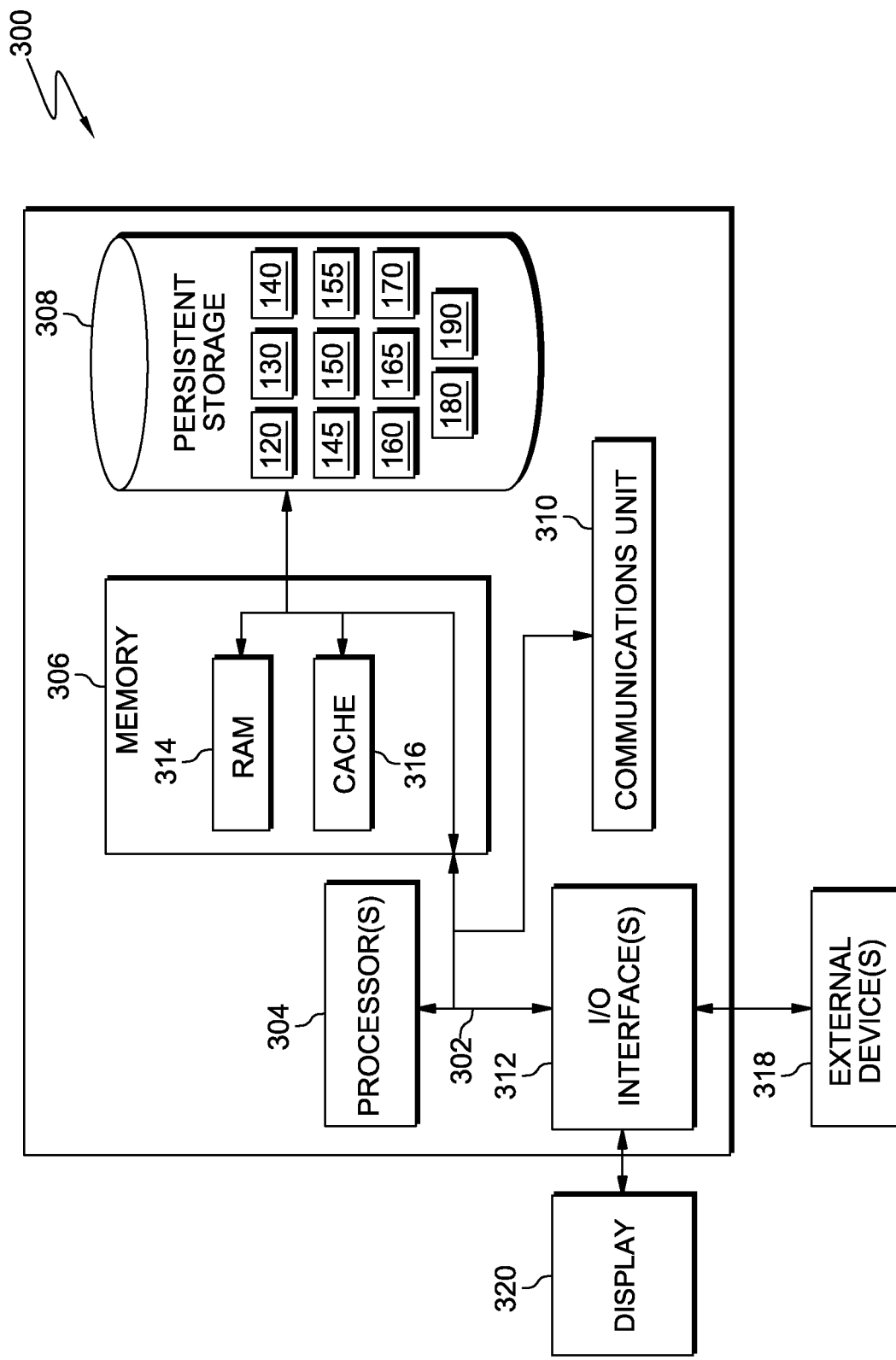
FIG. 3 depicts a block diagram of components of a computing device executing a search application, in accordance with an embodiment of the present invention.

FIG. 3 depicts a block diagram of components of computing device 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Hypervisor 120, virtual machine repository 130, virtual machines 140 and 150, data collection agents 145 and 155, snapshot repository 160, snapshot 165, database 170, search application 180, and system controller 190 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of enterprise grid 112 and client devices 104, 106, and 108. In these examples, communications unit 310 includes one or more network interface cards. Communications unit 310 may provide communications through the use of either or both physical and wireless communications links. Hypervisor 120, virtual machine repository 130, virtual machines 140 and 150, data collection agents 145 and 155, snapshot repository 160, snapshot 165, database 170, search application 180, and system controller 190 may be downloaded to persistent storage 308 through communications unit 310.

I/O interface(s) 312 allows for input and output of data with other devices that may be connected to server computer 102. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., search application 180, database 170, data collection agent 145, and data collection agent 155, can be stored on such portable computer-readable storage media and can be loaded onto persistent storage 308 via I/O interface(s) 312. I/O interface(s) 312 also connects to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining optimal pathways for creating a virtual machine (VM) with a given set of requirements, the method comprising:
   a computer receiving at least one requirement for a new VM;
   a computer identifying an existing VM to be modified during the generation of the new VM;
   a computer determining at least one step necessary to create the new VM configuration from the existing VM;
   a computer presenting to a user pathways for creating the new VM from the existing VM, wherein the pathways include at least three of: a total time required to create the new VM, a number of steps required to create the new VM, the at least one step, a complexity of the at least one step, and a degree of difficulty of the at least one step; and
   a computer receiving a selection of a presented pathway to create the new VM.

2. The method described in claim 1, the method further comprising:
   the computer searching a VM and snapshot databases for a VM or a snapshot, wherein the search is based, at least in part, on a type of installed software required by the new VM, and a type of operating system required by the new VM.

3. The method described in claim 1, wherein the existing VM is similar to the new VM based on at least one of a) a type of installed operating system, b) a type of same installed application, or c) a quantity of an allocated hardware resource.

4. The method described in claim 1, wherein the determined at least one step necessary to create the new VM configuration from the existing VM includes at least one of: installing an operating system onto the existing VM, installing an application onto the existing VM, and updating an installed application of the existing VM.

5. The method described in claim 1, wherein the degree of difficulty of the at least one step comprises a degree of difficulty of the at least one step necessary to create the new VM configuration from the existing VM configuration.

6. The method described in claim 1, wherein the at least one requirement for the new VM includes: a type of the installed operating system, an installed application, and an allocated amount of hardware resources.

7. The method described in claim 1, the method further comprising:
   the computer executing, at least a part of, the selected pathway.

8. The method described in claim 1, wherein the complexity of the at least one step comprises a complexity of the at least one step necessary to create the new VM configuration form the existing VM configuration.

9. The method described in claim 1, wherein the complexity of the at least one step necessary to create the new VM configuration from the existing VM configuration is based on at least one of: a number of keystrokes required to install a software component, an amount of manual data input required to install additional software, and a number of carriage returns required to install additional software.

10. The method described in claim 1, wherein the determined at least one step necessary to create the new VM configuration from the existing VM includes installing an operating system onto the existing VM, installing an application onto the existing VM, and updating an installed application of the existing VM.

* * * * *